United States Patent
Furusawa et al.

(10) Patent No.: US 7,449,997 B2
(45) Date of Patent: Nov. 11, 2008

(54) AUTO LIGHT SYSTEM

(75) Inventors: Isao Furusawa, Hitachinaka (JP); Tatsuhiko Monji, Hitachinaka (JP); Jun Higashino, Wako (JP); Fujio Iida, Wako (JP)

(73) Assignees: Hitachi, Ltd., Tokyo (JP); Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 10/874,747

(22) Filed: Jun. 24, 2004

(65) Prior Publication Data
US 2005/0036325 A1 Feb. 17, 2005

(30) Foreign Application Priority Data
Jun. 25, 2003 (JP) ............................. 2003-181805

(51) Int. Cl.
*B60Q 1/26* (2006.01)
(52) U.S. Cl. ..................... 340/468; 340/458; 340/438; 362/460
(58) Field of Classification Search ................ 340/468, 340/441, 933, 938, 426.25, 426.34, 438, 340/436, 458; 382/104; 701/36; 362/460, 362/466, 276, 37, 465, 459
See application file for complete search history.

(56) References Cited

U.S. PATENT DOCUMENTS

| 4,037,197 | A | * | 7/1977 | County | 360/468 |
| 4,236,099 | A | | 11/1980 | Rosenblum | |
| 6,010,237 | A | * | 1/2000 | Gotou | 362/460 |
| 6,183,118 | B1 | * | 2/2001 | Toda et al. | 362/465 |
| 6,193,398 | B1 | * | 2/2001 | Okuchi et al. | 362/466 |
| 6,459,387 | B1 | | 10/2002 | Kobayashi et al. | |
| 6,728,393 | B2 | * | 4/2004 | Stam et al. | 382/104 |
| 6,785,595 | B2 | * | 8/2004 | Kominami et al. | 701/36 |
| 6,919,820 | B2 | * | 7/2005 | Makita et al. | 340/903 |

FOREIGN PATENT DOCUMENTS

| JP | 4-95535 AU | 8/1992 |
| JP | 06-295601 | 10/1994 |
| JP | 9-39648 A | 2/1997 |
| JP | 11-208366 | 8/1999 |
| JP | 2003-159985 A | 6/2003 |
| WO | WO 01/70538 A2 | 9/2001 |

OTHER PUBLICATIONS

European Search Report dated May 4, 2006 (Three (3) pages).
Japanese office action dated Jun. 3, 2008 with partial English translation.

* cited by examiner

*Primary Examiner*—Anh V. La
(74) *Attorney, Agent, or Firm*—Crowell & Moring LLP (57) ABSTRACT

An auto light system allows the driver to control the head light beam direction and range, via a light control device. A manual light operating device for operating the light manually is operated in response to an output signal from the light control device. A display device displays the control state of the light controlled by the light control device.

6 Claims, 11 Drawing Sheets

FIG. 3A
HORIZONTAL DIRECTION LIGHT AXIS DISPLACEMENT

FIG. 3B
IMAGE CAPTURED IN THE NIGHT TIME

AUTO LIGHT SYSTEM

BACKGROUND OF THE INVENTION

The present invention relates to an auto light system, specifically to an auto light system of the vehicle having Human Machine Interfaces.

In the prior art of the auto light system for turning ON and OFF the light of the vehicle, the states of the light selectable by the driver are generally four states, Light OFF, Auto Light ON, Small Light ON and Head Light ON, and the driver operates the light switch accordingly in order to specify the state of the light as one of these four states. When the switch is turned to the position of Auto Light ON, the switching ON and OFF of the small light and the head light are operated automatically in response to the surrounding brightness. The driver can recognize the state of the light by observing the light switch positioned at one of four states as described above. The driver may confirm whether or not the light is positioned at high beam by observing the indicator lamp mounted on the panel viewable from the driver's position. In addition to this kind of light control system, there is such a vehicle light system as detecting the preceding vehicle based on the image signal supplied by the image capturing means and controlling at least one of the vertical projection direction of the head light and the beam range of the head light in order to prevent the preceding vehicle driver from being dazzled by the head light. (For example, refer to Japanese Patent Laid-Open Number 6-295601 (1994)).

Furthermore, there is such an adaptive front lighting system for the vehicle head light as detecting the preceding vehicle, controlling the vertical direction of the light axis of the head light based on the relative position to the preceding vehicle, detecting the road curvature of the driving lane, and controlling the horizontal direction of the light axis of the head light based on the detected road curvature. (For example, refer to Japanese Patent Laid-Open Number 11-208366 (1999))

SUMMARY OF THE INVENTION

In case that those prior art systems are applied to the actual vehicle, when Auto Light state is selected, the driver may have difficulty in identifying the light state as one of four states, Light OFF, Small Light ON and Head Light ON only by observing the condition of the light projected on the road when driving the vehicle at nightfall, in the rain or on the bright street in down town. In addition, as the light control system controlling the light axis of the head light may change the state of the light continuously more than the prior art system does, the driver may have difficulty in identifying the exact state of the light and the driver may not be able to confirm the light beam distribution, that is, the light direction and range and the light intensity distribution. In such a case, even if the lighting control is optimized, the driver may fail to confirm the light direction and the light intensity distribution and has no choice but to switch the auto light mode to the manual mode. In case that the light switch has more refined positions such as Light OFF, Small Light ON, Low Beam (Short Range) ON, Low Beam (Long Range) ON, High Beam (Short Range) ON and High Beam (Long Range) ON, the diver may confuse the light switch operations if the light switch is designed with conventional styles and position transition settings, which may make it rather difficult for the driver to recognize the light states resulted by his or her operations.

It is therefore an object of the present invention to provide an auto light system which is capable of making the driver recognize the light states of plural lights instantly and operate the lights easily.

In order to attain the above object, the auto light system according to the present invention comprises a light control means for controlling the light of the vehicle, and a display means for displaying the control states of said light controlled by said light control means.

The auto light system so configured as described above enables to control the lights of the vehicle and irradiate adequately the light beam, and allows the driver to recognize easily the light state by means of displaying the control state of the controlled light.

The auto light system according to the present invention is an auto light system comprising a light control means for controlling the light of the vehicle and a manual light operation means for operating manually the light, in which the manual light operating means is operated based on the output signal from the light control means.

The auto light system so configured as described above can control the light of the vehicle and irradiate adequately the light beam, and as the control state of the controlled light is fed back to the manual light operating means, it will be appreciated that the driver can adjust the light smoothly without strange feeling when the driver operates manually the light.

In the auto light system according to the present invention, the manual light operating means comprises a selector switch for switching the Auto state and the Manual state of the light.

In the auto light system so configured as described above, as the selector switch is switched according to the Auto state or the Manual state of the light control means, it will be appreciated that the driver can recognize the state of the light control means.

In the auto light system according to the present invention, the light control means controls the control state of the light by selecting alternatively the Auto state and the Manual state based on the output signal of the selector switch.

In the auto light system so configured as described above, as the control state is switched to the Manual state when the driver operates manually the light adjusting switch, it will be appreciated that the light beam can be irradiated to the position intended by the driver and preserve its state.

In the auto light system according to the present invention, the light includes the head light and the small light of the vehicle.

As the auto light system so configured as described above is used for the light with the beam irradiating ahead of the driving vehicle, it will be appreciated that the driver can drive the vehicle safely and comfortably.

In the auto light system according to the present invention, the manual light operating means comprises an adjusting switch for adjusting the light beam distribution of the head light.

In the auto light system so configured as described above, as the head light can be operated so as to be changed continuously, it will be appreciated that the light beam from the head light can be positioned promptly to the intended position. The light control state controlled by the light control means can be confirmed not only by using the display means but also by observing the adjusting switch.

In the auto light system according to the present invention, if the adjusting switch is operated in the Auto state, the control state is switched to the Manual state, and then the control state is switched to the Auto state after a designated constant time has passed.

In the auto light system so configured as described above, as the selector switch is switched to the Auto state in a designated constant time passed after the head light was positioned to the position intended by the driver, it will be appreciated that the driver can save the trouble in switching back to the Auto state by operating the selector switch.

In the auto light system according to the present invention, if the adjusting switch is operated and the control state is switched to the Manual state when the head light is in the Auto state and high beam, the head light is switched to low beam.

In the auto light system so configured as described above, as the head light at high beam is switched to low beam in synchronization with the timing for switching from the Auto state to the Manual state, it will be appreciated that the driver of the vehicle ahead of the driving vehicle can be prevented from being dazzled by the head light in the existence of the vehicle coming from the opposite position or the preceding vehicle.

In the auto light system according to the present invention, if the adjusting switch is operated, the control state is switched from the Manual state to the Auto state and the light control means provides an instruction for high beam when the head light is in the Manual state and low beam, the head light is switched stepwise to high beam.

In the auto light system so configured as described above, as the head light is switched stepwise to high beam, it will be appreciated that the driver can recognize stepwise the road condition ahead of the driving vehicle. In addition, it will be appreciated that the driver of the vehicle ahead of the driving vehicle can be prevented from being dazzled suddenly by the head light.

In the auto light system according to the present invention, the display means is an indicator for displaying a beam range distance of the head light and/or the beam direction of the head light.

In the auto light system so configured as described above, it will be appreciated that the driver can recognize easily the beam range and/or the beam direction of the head light changed by the control of the light control means or the operation of the manual light operating means, and also that the driver can operate the head light with the beam irradiation range and direction intended by the driver.

The auto light system according to the present invention comprises an outside environment detecting means for detecting at least one state of brightness, weather and road, in which the light control means controls the light based on the detection result of the outside environment detecting means. The outside environment detecting means is an image capturing apparatus for taking a picture of the outside environment.

As the auto light system so configured as described above controls the head light according to the outside environment by using the image provided by the image capturing apparatus and so on, it will be appreciated that the head light can be used efficiently and without unnecessary operations. As the road conditions are detected, it will be appreciated that the driver can drive the vehicle comfortably.

The auto light system according to the present invention comprises the vehicle state detecting means for detecting the driving state of the vehicle, and the light control means controls the light based on the detecting result of the vehicle state detecting means.

As the auto light system so configured as described above determines the beam irradiation of the head light according to the driving state of the vehicle, it will be appreciated that the view range of the driver can be improved and thus, the driver can drive the vehicle comfortably.

In the auto light system according to the present invention, the light control means adjusts the beam distribution of the head light by adjusting the light axis of the head light.

In the auto light system so configured as described above, it will be appreciated that the beam irradiation can be controlled in the vertical and horizontal directions with a single head light by controlling the light axis of the head light.

In the auto light system according to the present invention, the light intensity is changed according to the change in the light axis of the head light.

In the auto light system so configured as described above, as the light intensity is changed according to the change in the light axis, it will be appreciated that the light intensity can be determined in accordance with the beam direction and the beam range. This means that the adequate light intensity can be determined so as to prevent the driver of the vehicle ahead of the driving vehicle from being dazzled by the head light in existence of the preceding vehicle or the vehicle coming from the opposite direction. In addition, in case that the control system misjudges that there is no preceding vehicle or no vehicle coming from the opposite direction, it will be also appreciated that, by limiting the light intensity of high beam, the driver of the vehicle ahead of the driving vehicle can be prevented from being dazzled by the head light.

In the auto light system according to the present invention, the light control means adjusts the beam distribution of the head light by adjusting the beam intensity of the head light.

In the auto light system as configured as described above, it will be appreciated that the visual range in the longitudinal direction to the intended position of the light beam ahead of the driving vehicle can be optimized. In addition, it will be appreciated that the drive apparatus for operating mechanically the head light is not required and the system can be provided at a moderate price.

DETAILED DESCRIPTION OF THE PREFERRED EMBODIMENTS

Figure 1:
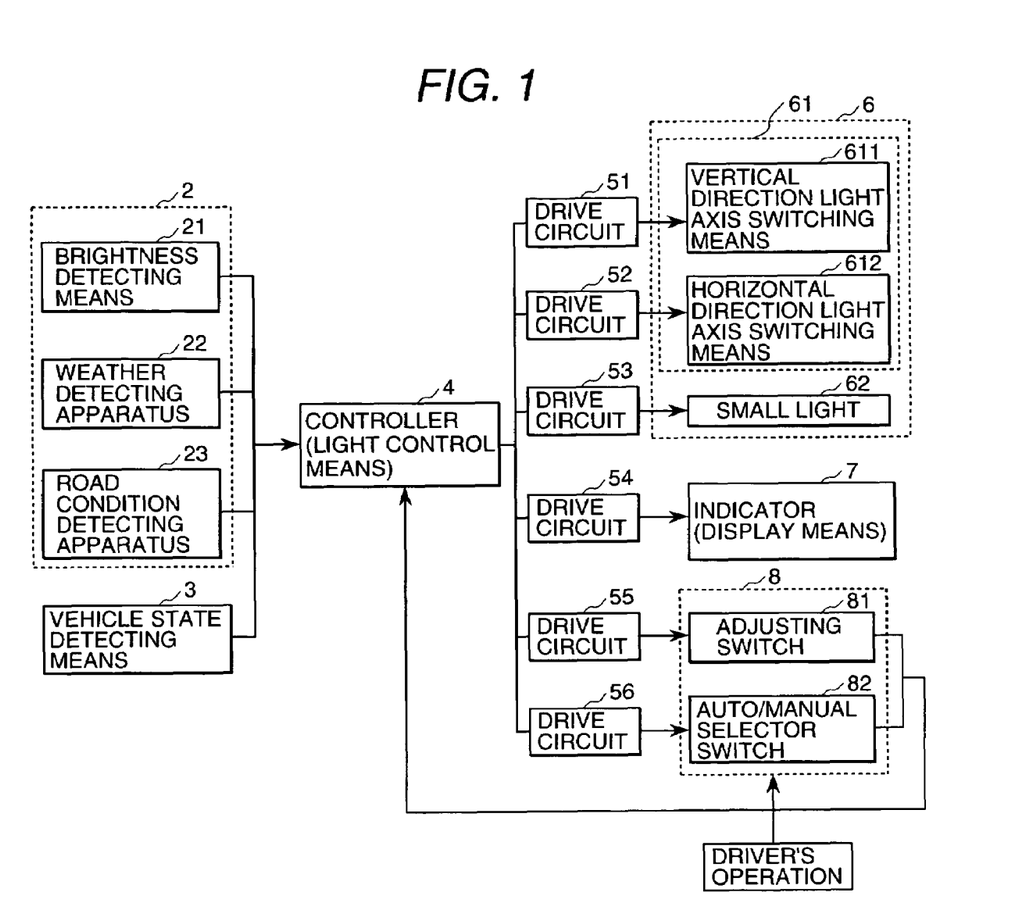
FIG. 1 is a control block diagram showing a general configuration of one embodiment of the auto light system according to the present invention.

By referring to attached figures, the embodiment of the auto light system according to the present invention will be described in detail. FIG. 1 shows a control block diagram showing the general configuration of the auto light system of one embodiment of the present invention.

As show in FIG. 1, the auto light system of this embodiment comprises the outside environment detecting means 2, the vehicle state detecting means 3, the controller 4, the drive circuits 51 to 56, the light 6, the indicator (display means) 7 and the light switch (manual light operating means) 8.

The outside environment detecting means 2, comprising the brightness detecting apparatus 21 for detecting the brightness around the vehicle, the weather detecting apparatus 22 for detecting the weather conditions such as fair, rain and fog, the road condition detecting apparatus 23 for detecting the road curvature, and the position of the preceding vehicle and the position of the vehicle coming from the opposite direction, detect the environment outside the vehicle. The vehicle state detecting means 3 detects the state of the vehicle operated by the driver from the various sensors installed at the vehicle such as steering angle and vehicle speed. Those detected data are supplied to the controller 4.

The controller 4 sends the output signals to the drive circuits 51 to 56 in response to those detected data, and controls the light 6, the indicator 7 and the lighting switch 8.

The light 6 comprises the head light 61 and the small light 62. The head light 61 comprises the vertical direction light axis selecting means 611 and the horizontal direction light axis selecting means 612, and controls the light axis of the head light 61 in the vertical and horizontal directions by operating the drive circuits 51 and 52. The indicator 7 displays the control state of the light 6 controlled by the drive circuit 54.

The lighting switch 8 comprises the adjusting switch 81 and the Auto/Manual selector switch, and the position of the adjusting switch 81 is controlled by the drive circuit 55 in response to the control state of the light 6. The Auto/Manual selector switch 82 is positioned to Auto or Manual position by the drive circuit 56 in response to the control state of the controller 4. When the controller 4 is in the Auto state (the state in which the controller 4 is operated in response to the detected data of the outside environment detecting means 2 and the vehicle state detecting means 3), the Auto/Manual selector switch 82 is positioned at the Auto position, and when the controller is in the Manual state (the state in which the adjusting switch 8 is operated manually by the driver), the Auto/Manual selector switch 82 is switched to the Manual position.

On the other hand, the lighting switch 8 controls the light by the manual operation of the driver. When the adjusting switch 8 is operated manually, its manual control variable is supplied as a signal to the controller 4, and the controlled output from the controller 4 is processed by the drive circuits 51 to 54 and transferred to the light 6 and the indicator 7. In addition, when the Auto/Manual selector switch 82 is operated manually, the Auto state and the Manual state of the controller 4 are selected alternatively.

In the manner described above, the output conditions of the light 6, the indicator 7 and the adjusting switch 81 are changed in response to the positions of the Auto/Manual selector switch 82. When the controller 4 is in the Auto state (the state in which the Auto/Manual selector switch 82 is positioned at the Auto position), for example, when the driving vehicle is going round a left curve, the controller 4 transmits the output signal to the drive circuit 52 based on the data for the left curve detected by the road condition detecting apparatus 23 or the vehicle state detecting means 3 and controls the head light so as to be oriented in the left direction by using the horizontal direction light axis switching means 612. Then, the controller displays the light state representing the left direction onto the indicator 7 and operates the adjusting switch 81 of the lighting switch 81.

As the manual operation by the driver is only respected when the controller 4 is in Manual state (when Auto/Manual selector switch 82 is positioned at Manual position), the light axis of the light 6 and the indicator 7 do not change their states as long as the drier operates the adjusting switch 81.

Figure 2:
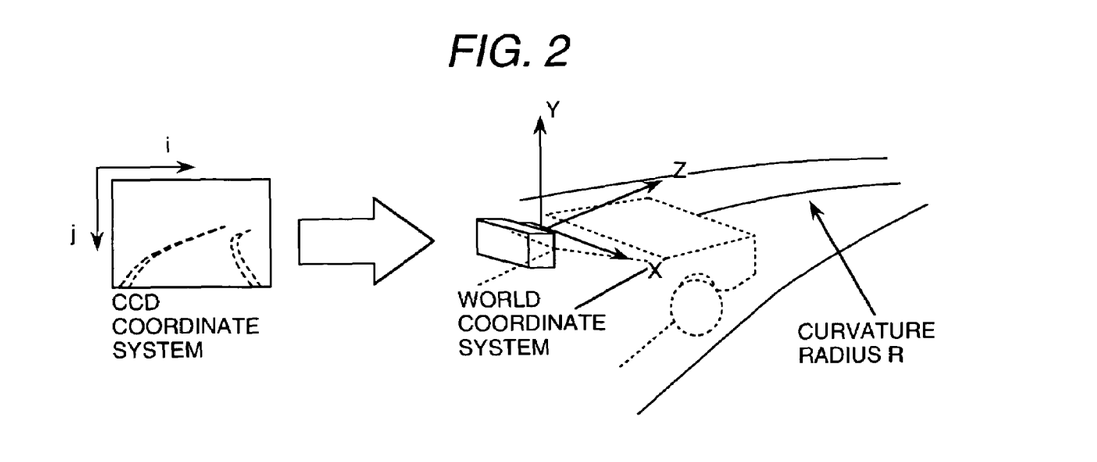
FIG. 2 is a schematic diagram showing the method for calculating the road curvature by using the road status detecting apparatus of the auto light system shown in FIG. 1.

FIG. 2 is a schematic diagram showing the method for calculating the road curvature by using the road status detecting apparatus 23 of the outside environment detecting means 2 of the auto light system according to this embodiment. At first, the edge of the lane on which the driving vehicle is running is detected by applying the SOBEL filter to the image provided by the image capturing apparatus in the road condition detecting means 23. Then, the coordinates of the detected edge point measured in the local coordinate system defined by the camera position and orientation parameters (the pitch, yaw and roll angles and the camera height and so on) are transformed to the real world coordinates (in the world coordinate system), and then the curvature radius of the road is calculated from the estimated center position of the lane.

Figure 3A:
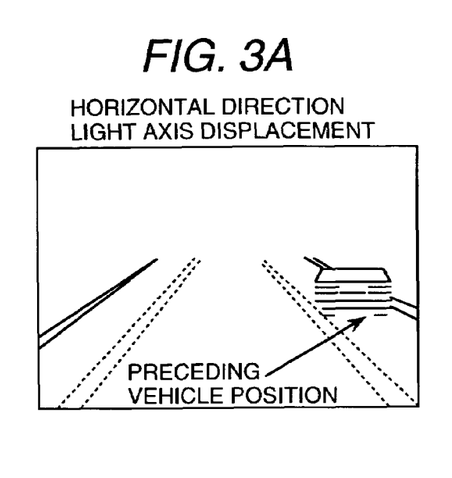
FIG. 3A and FIG. 3B are schematic diagrams showing the image data for detecting the preceding vehicle by using the road status detecting apparatus of the auto light system shown in FIG. 1.
Figure 3B:
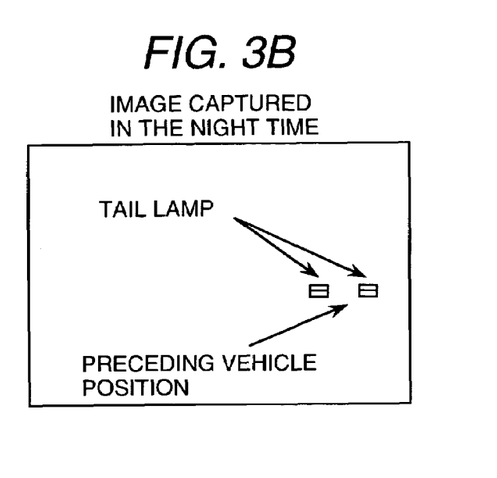

FIG. 3A and FIG. 3B are schematic diagrams describing the detection of the preceding vehicle by using the road state detecting apparatus 23 of the outside environment detecting means 2 of the auto light system according to this embodiment. FIG. 3A shows the image captured in the day time when the preceding vehicle is detected, and FIG. 3B shows the image captured in the night time when the preceding vehicle is detected. Whether the preceding vehicle or the vehicle coming from the opposite direction exists is judged based on the edge information or the light information of the vehicle by using the image provided by the image capturing apparatus as described above. The edge image extended in the horizontal direction is detected in the day time as shown in FIG. 3A, and the image of the light projected ahead of the vehicle is detected as shown in FIG. 3B. Then, the relative distance to the preceding vehicle or the vehicle coming from the opposite direction is estimated by transforming the position and orientation information in the detected image to the coordinates in the world coordinate system.

Figure 4A:
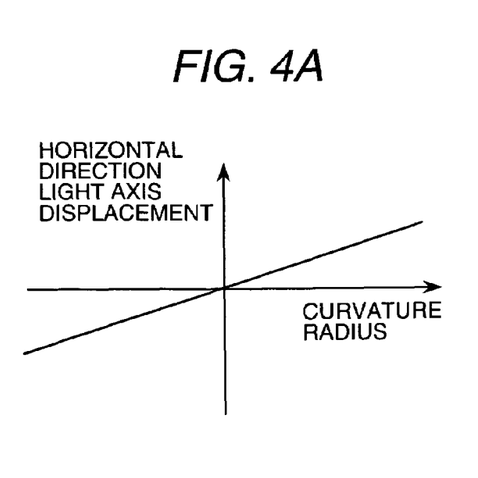
FIG. 4A and FIG. 4B are drawings for calculating the controlled variable for the light axis of the head light by using the controller of the auto light system shown in FIG. 1.
Figure 4B:
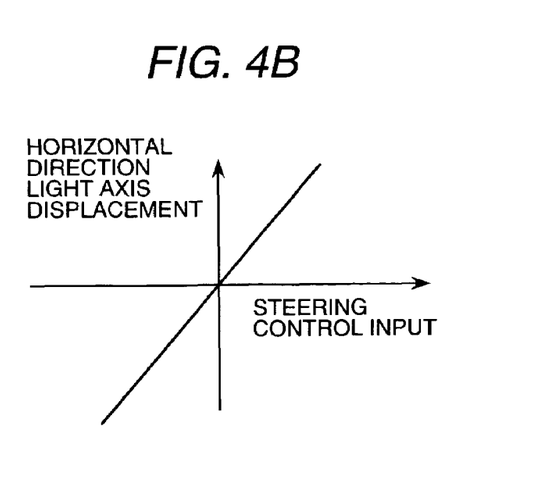

FIG. 4A and FIG. 4B show the graphs for estimating the light axis displacement in the horizontal direction by using the controller 4 of the auto light system according to this embodiment. FIG. 4A represents the graph mapping the estimated road curvature radius to the horizontal light axis displacement, and FIG. 4B represents the graph mapping the steering control input to the horizontal light axis displacement. FIG. 4A and FIG. 4B are used for changing the light axis in the horizontal direction in response to the road curvature and the steering control input, respectively. Those graphs are used for adjusting the beam direction of the head light 61 exactly onto the driving lane on which the driving vehicle is running, or used for adjusting the beam direction of the head light 61 exactly onto the running direction of the vehicle by considering the current orientation of the vehicle body.

Figure 5A:
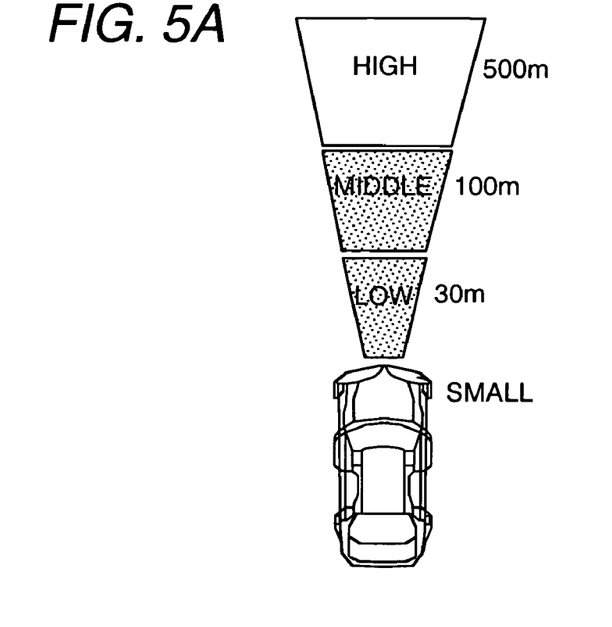
FIG. 5A to FIG. 5F are drawings for showing the display state of the indicators of the auto light system shown in FIG. 1, FIG. 5A to FIG. 5C illustrating the indicator for the forward light beam direction and range, FIG. 5D and FIG. 5E illustrating the indicator for the right and left light beam direction and range and FIG. 5F illustrating the forward, right and left light beam direction and range.
Figure 5B:
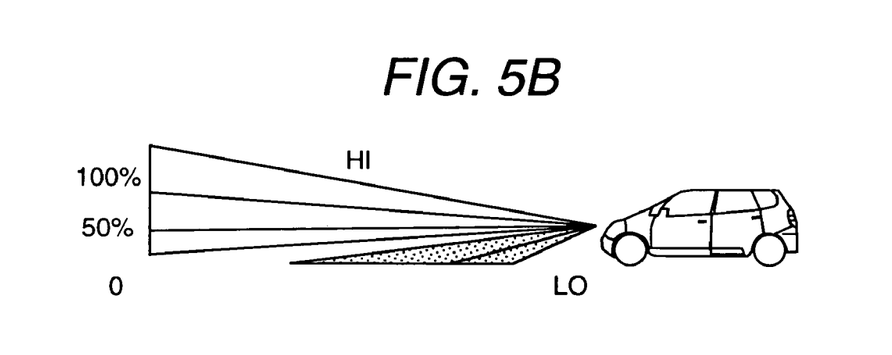
Figure 5C:
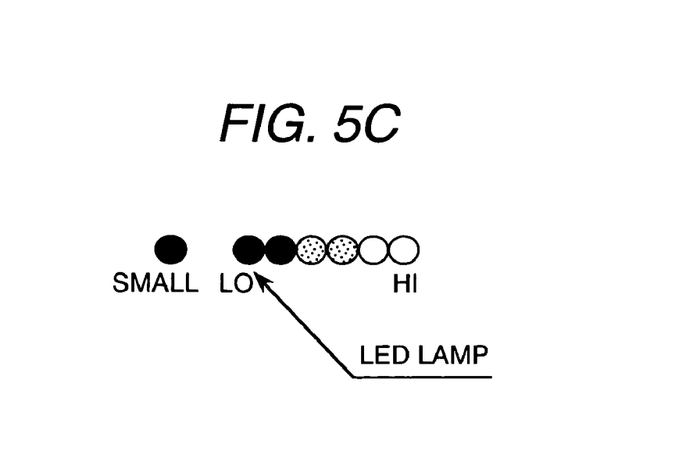
Figure 5D:
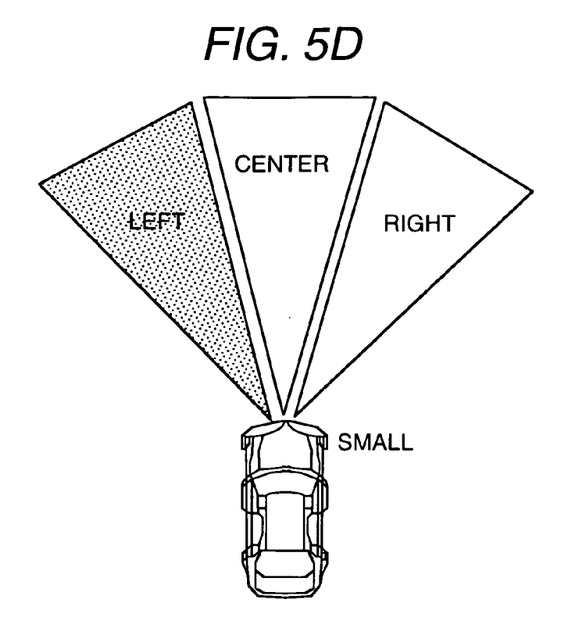
Figure 5E:
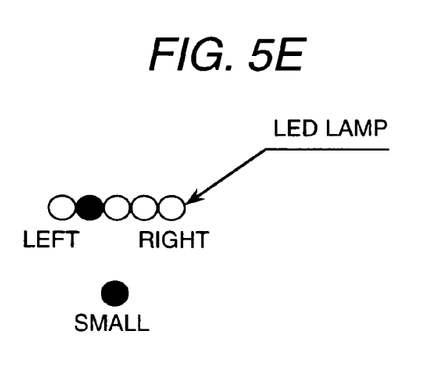
Figure 5F:
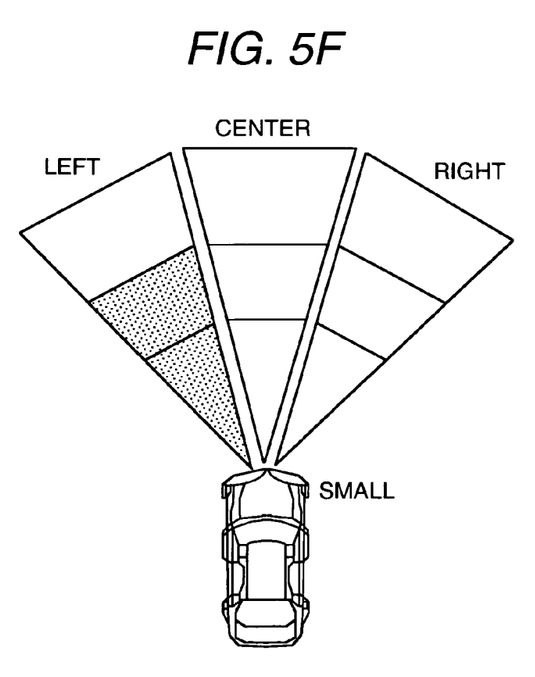

FIG. 5A to FIG. 5F shows the display contents of the indicator 7 of the auto light system of this embodiment. FIG. 5A to FIG. 5C show the display state of the small light 62 turned ON or OFF and the beam projection and range pattern of the head light 61 in the forward direction of the vehicle, FIG. 5D and FIG. 5E show the display state of the small light 62 turned ON or OFF and the beam direction and range pattern of the head light 61 in the left and right directions of the vehicle, and FIG. 5F shows the display state of the small light 62 turned on or off and the beam direction and range pattern of the head light 61 in the forward, left and right directions of the vehicle.

FIG. 5A illustrates the display of the lighting state viewed from above the driving vehicle, in which the indicator 7 has the display lamp for the small light 62 turned on or off, and three display lamps labeled with LOW, MIDDLE and HIGH and arranged from the driving vehicle in this order, each corresponding to the beam range of the head light 61. In this example, the small light 62 is turned on and the beam range of the head light 61 is MIDDLE (about 100 m ahead of the driving vehicle). FIG. 5B illustrates the display of the lighting state viewed from the side of the driving vehicle, in which the indicator 7 has the display lamp for the small light 62 turned on or off, and multiple display lamps labeled with multiple beam ranges from Low (close) to High (distance) corresponding to the beam range of the head light 61. In this example, the small light 62 is turned on and the light beam from the head light 61 covers the close range (Low) from the driving vehicle. FIG. 5C illustrates the display of plural LEDs arranged in the horizontal direction, in which LEDs are turned on sequentially from left to right corresponding to the small light 62 turned on or off and the beam range of the head light 61.

FIG. 5D illustrates the display of the lighting state viewed from above the driving vehicle, in which the indicator has the display lamp for the small light 62 turned on or off, and three display lamps labeled with LEFT, CENTER and RIGHT and arranged from left to right in this order, each corresponding to the beam direction of the head light 61. In this example, the beam direction of the head light 61 is LEFT. FIG. 5E illustrates the display of plural LEDs arranged in the horizontal direction, in which LEDs are turned on corresponding to the small light 62 turned on or off and the beam range of the headlight 61. In this example, the beam direction of the head light 61 is LEFT FIG. 5F illustrates the combination of display layouts shown in FIG. 5A and FIG. 5D, in which both of the beam rage and direction of the head light 61 can be recognized concurrently, and in this example, the beam range of the head light 61 is MIDDLE (about 100 m ahead) in the LEFT direction of the driving vehicle.

Figure 6A:
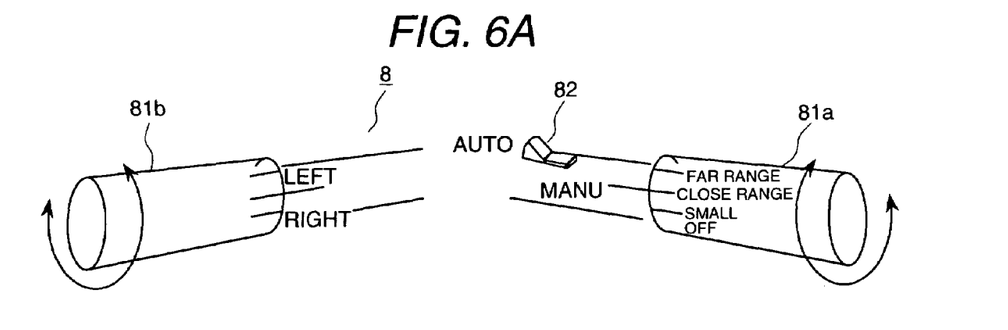
FIG. 6A to FIG. 6D are drawings for showing the lighting switch of the auto light system shown in FIG. 1, FIG. 6A illustrating lighting switches provided at the winker lever, FIG. 6B illustrating the rotary switches, FIG. 6C illustrating the slide switches and FIG. 6D illustrating the slider switches shown in FIG. 6C at the steering wheel.
Figure 6B:
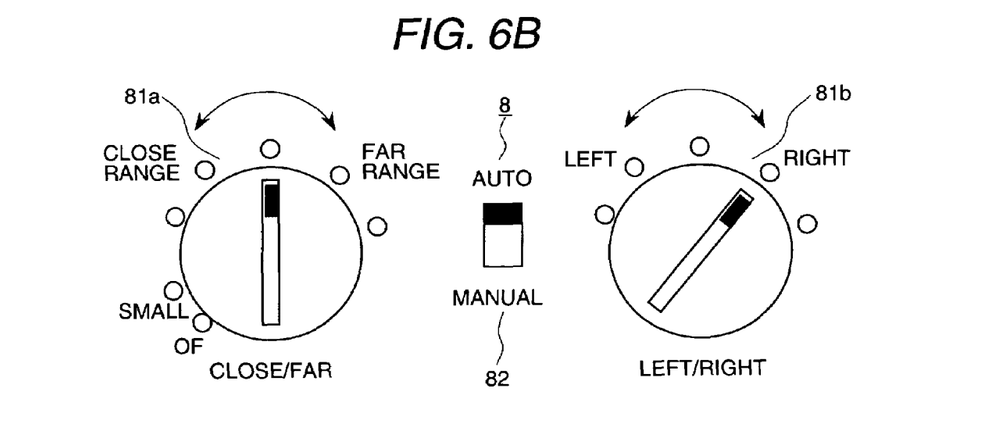
Figure 6C:
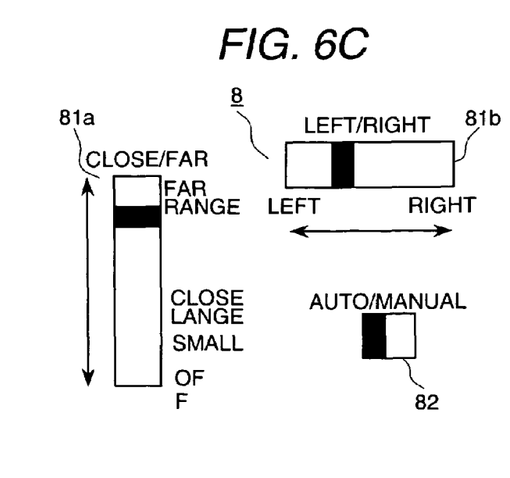
Figure 6D:
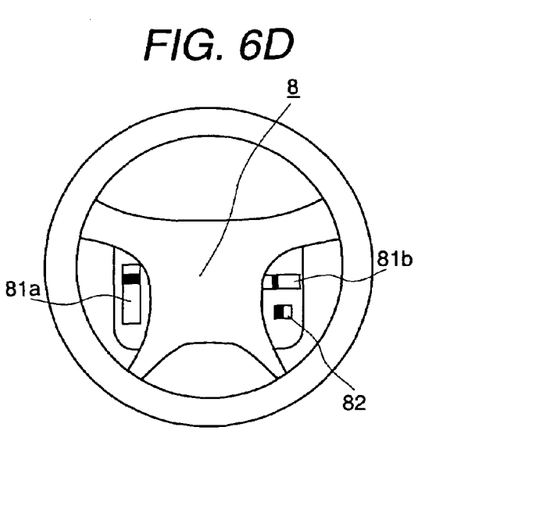

FIG. 6A to FIG. 6D show the lighting switch 8 of the auto light system of this embodiment. FIG. 6A illustrates the configuration in which the Auto/Manual selector switch 82 is installed with the winker switch and so on, and the adjusting switch 81 is installed at the top end of the winker switch lever. By rotating the vertical direction light axis adjusting switch 81a and the horizontal direction light axis adjusting switch of the adjusting switch 81, the light axis of the head light 61 can be operated in the vertical and horizontal directions, respectively. FIG. 6B illustrates another embodiment in which the rotary type Auto/Manual selector switch 82 and the adjusting switch 81 are provided at the lower part of the meter panel inside the vehicle, and the light axis of the head light 61 can be operated in the vertical and horizontal directions, respectively, by the driver rotating manually the vertical direction light axis adjusting switch 81 a and the horizontal direction light axis adjusting switch 81b of the adjusting switch 81. FIG. 6C illustrates another embodiment in which the slide type Auto/Manual selector switch 82 and the adjusting switch 81 are provided at the lower part of the meter panel inside the vehicle, and the light axis of the head light 61 can be operated in the vertical and horizontal directions, respectively, by the driver sliding manually the vertical direction light axis adjusting switch 81a and the horizontal direction light axis adjusting switch 81b of the adjusting switch 81. FIG. 6D illustrates the configuration in which the switches in the embodiment illustrated by FIG. 6C are provided at the steering wheel, and the driver can operate quickly the lighting switches while driving the vehicle.

Figure 7:
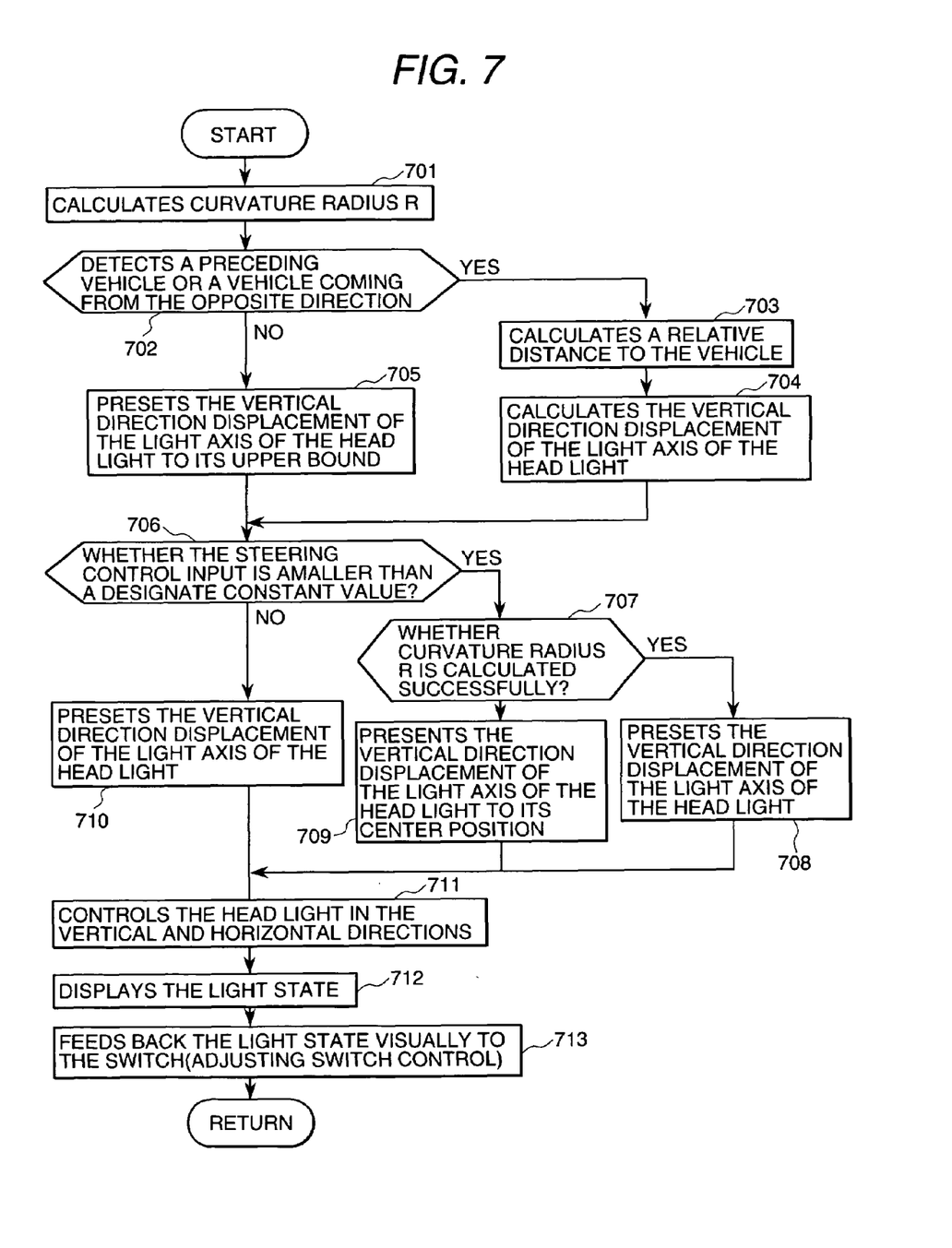
FIG. 7 is a control flow diagram for Auto state of the auto light system shown in FIG. 1.

FIG. 7 shows the control flow diagram in which the auto light system of this embodiment is in the Auto state (the Auto/Manual selector switch 82 is positioned at Auto position for automatic control). For the Auto state, the start blocks of the control flow diagrams shown in FIGS. 8 to 12 are initiated conditionally if and only if the electric power is supply to the individual lights 6, the individual lights 6 are required to be turned on by the request of the brightness detecting apparatus 21 and the functions having the capabilities to be described in detail below. For the Manual state, the start blocks are initiated conditionally if and only if the electric power is supply to the individual lights 6 and the functions having the capabilities to be described in detail below.

At first, in Step 701, the curvature radius R of the driving lane ahead of the driving vehicle is calculated for the image supplied by the image capturing apparatus of the road condition detecting apparatus 23 installed near the rear view mirror as shown in FIG. 2. Next, in Step 702, whether a preceding vehicle or a vehicle coming from the opposite direction exists is judged as shown in FIG. 3, and if there exists a vehicle, Step 703 is selected, in which the relative distance to the vehicle is estimated. Then, in Step 704, the vertical direction displacement of the light axis of the head light 61 is preset based on the relative distance to the preceding vehicle or the vehicle coming from the opposite direction estimated in Step 703. In this step, it is allowed to set the high beam intensity lower than the designated constant value in order to prevent the driver of the vehicle ahead of the driving vehicle from being dazzled by the head light. On the other hand, if Step 702 judges that there is no vehicle ahead of the driving vehicle, Step 705 is selected next, in which the preset voltage to the head light for High Beam is set to be maximized and the present voltage to the head light for Low Beam is set to be minimized.

After completing the preset of the vertical direction light axis of the head light 61, the horizontal direction light axis of the head light 61 is preset in Step 706. In Step 706, whether the steering control input detected by the vehicle state detecting means 3 is larger than the predetermined constant value. In case that the steering control input is smaller than the predetermined constant value, it is judged that the driving road is curved gently, and then, Step 707 is selected next. In Step 707, whether the curvature radius R was calculated successfully is judged. If the calculation was not successful, it means that the curvature radius is extremely large, that is, as the driving lane is judged to be almost straight, the procedure proceeds to Step 709, where the horizontal direction light axis displacement of the head light 61 is set to be central. If the curvature radius R of the road is calculated successfully in Step 701, the horizontal direction light axis displacement of the head light 61 is set based on the curvature radius calculated in Step 701 by using the relation as described in FIG. 4A. In case that the steering control input is judged to be larger than the predefined constant value in Step 706, that is, the road is curved sharply, the procedure proceeds to Step 710, in which the horizontal direction light axis displacement of the head light 61 is set based on the steering control input detected in Step 706.

Next, in Step 711, the head light 61 is operated in response to the vertical and horizontal directions light axis displacement set in the steps so far, and then, the procedure proceeds to Step 712, in which the controlled direction and range of the light beam is displayed by using-one of the display modes shown in FIG. 5A to FIG. 5F, and finally, in Step 713, the position of the adjusting switch 81 of the lighting switch 8 in one of embodiments shown in FIG. 6A to FIG. 6D is changed according to the controlled direction and range of the light beam. As operated in the series of procedural steps so far, it will be appreciated that the driver can recognize easily how the head light 61 is controlled as well as the straightforward operational result from his or her intention can be obtained as the light axis of the head light 61 can be changed smoothly even if the adjusting switch 81 of the lighting switch 8 in Manual state.

Figure 8:
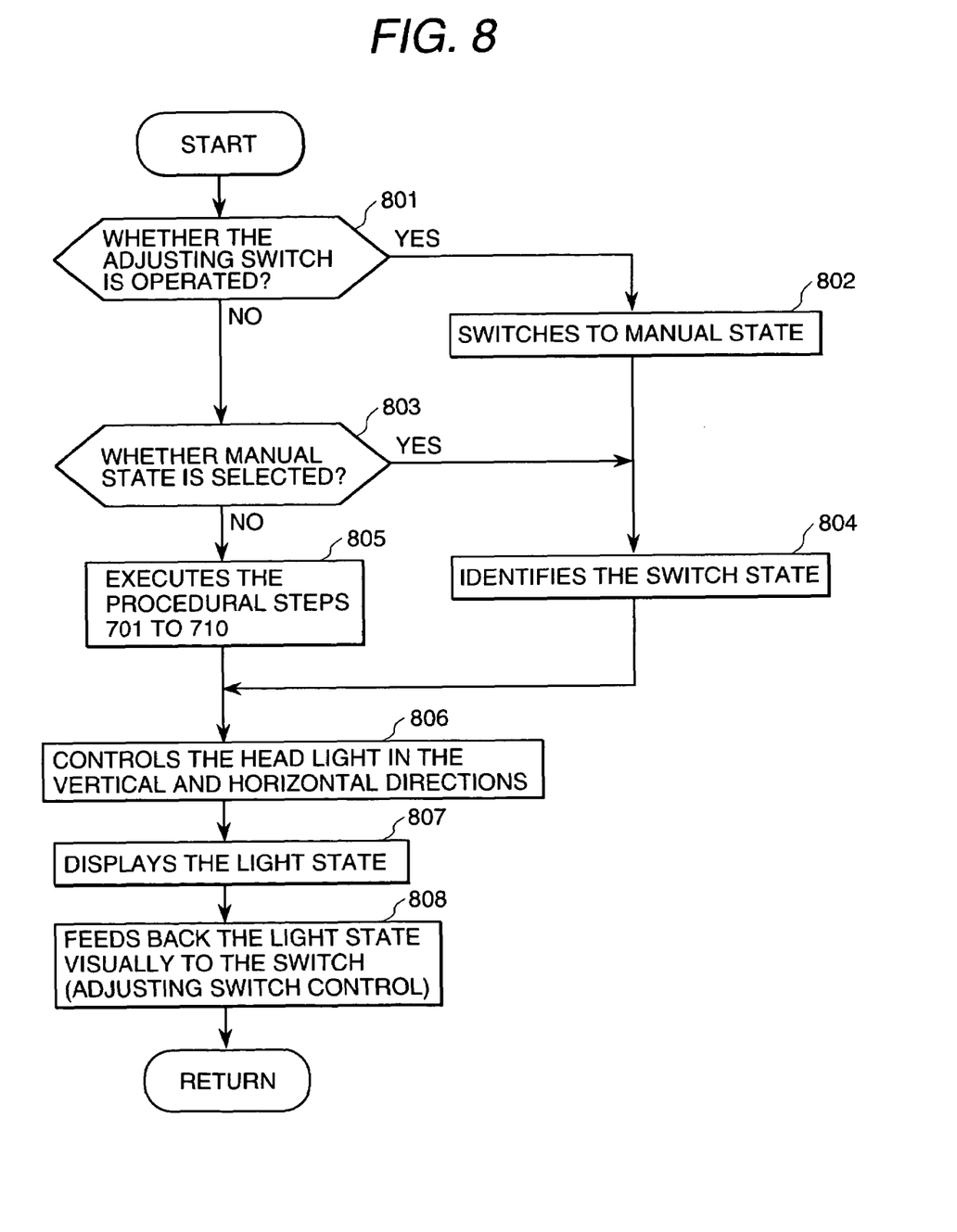
FIG. 8 is a control flow diagram in operating the adjusting switch at Auto state of the auto light system show in FIG. 1.

FIG. 8 shows the control flow diagram in case that the manual operation is initiated (the driver operate manually the adjusting switch 81 of the lighting switch 8) in Auto state in the auto light system of this embodiment. At first, in Step 801, whether the driver operates the adjusting switch 81 or not is judged. If the adjusting switch is operated, the procedure proceeds to Step 802, in which the Auto/Manual selector switch 82 of the lighting switch 8 is switched to the Manual position, and then the procedure proceeds to Step 804. On the other hand, if Step 801 judges that the adjusting switch 81 is not operated, whether the individual lights 6 are in Auto state or Manual state is confirmed in Step 803. If the light is in Manual state, the procedure proceeds to Step 804 as in the similar result from Step 802. In Step 804, the position of the adjusting switch 81 of the lighting switch 8 is recorded in the controller 4, and next, the head light 61 is controlled in Step 806. In case that the Auto state is confirmed in Step 803, the light is setup according to the Steps 701 to 711 shown in FIG. 7. As in the similar procedures as described above, the light axis of the head light 61 is controlled in the vertical and horizontal directions in Step 806, the controlled direction and range of the light 6 is displayed by the indicator 7 in Step 807, and then the position of the adjusting switch 81 is changed in response to the controlled direction and range of the light 6 in Step 808. As operated in the series of procedural steps so far, it will be appreciated that the driver is not required to control the head light 61 by switching manually the Auto/Manual selector switch 82 to the Manual position in order to switch the Auto state to the Manual state while driving the vehicle in Auto state.

Figure 9:
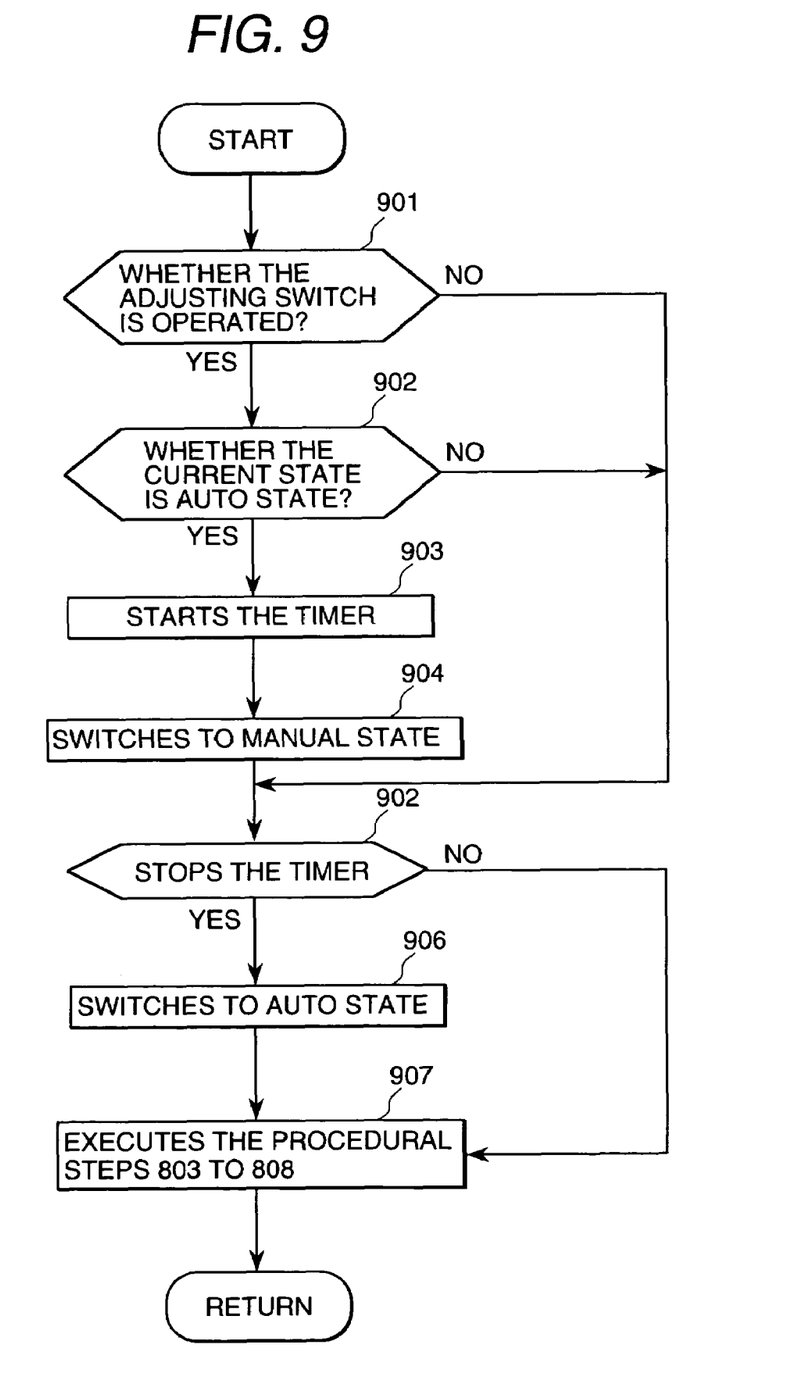
FIG. 9 is a control flow diagram for the operation with a timer at the control flow shown in FIG. 8.

FIG. 9 shows the control flow diagram, in case that the manual operation is initiated (the driver operate manually the adjusting switch 81 of the lighting switch 8) in Auto state in the auto light system of this embodiment, the Manual state set by the Auto/Manual selector switch 82 is switched to the Auto state by timer. At first, in Step 901, whether the driver operates the adjusting switch 81 or not is judged. If the adjusting switch is operated, the procedure proceeds to Step 902, in which whether the Auto state is selected is confirmed. If the Auto state is detected, the procedure proceeds to Step 903, in which the timer set with a constant count-up time is started in order to preserve a designated time period for operating in the Manual state. Then, the procedure proceeds to Step 904, in which the Auto/Manual selector switch 82 of the lighting switch 8 is switched from the Auto state to the Manual state, and then, the procedure proceeds to Step 905. In contrast, Step 901 judges that the adjusting switch 81 of the lighting switch 8 is not operated or Step 902 judges that the Auto state is not detected (but that the Manual state is detected), the procedure proceeds to Step 905. Next, Step 905 confirms that the timer is count up after a constant count-up time preset in Step 903 passed. As the timer setting is a task independent of the other tasks in the controller 4, if the timer is not count up (including the case that the timer is not setup in Step 903), the procedure proceeds to Step 907 in order to control the head light 61 in response to the control input from the adjusting switch 81 in preference to the other control instructions. On the other hand, if the timer count up is confirmed, responding to its confirmation signal, the procedure proceeds to Step 906, in which the Auto/Manual selector switch 82 is switched from the Manual state to the Auto state, and then the procedure proceeds to Step 907. In Step 907, Steps 803 to 808 shown in FIG. 8 are executed. As operated in the series of procedural steps so far, it will be appreciated that, as the beam direction and range intended by the driver can be preserved in a definite period of time when the driver operates the adjusting switch 81, the beam from the head light 61 can be projected exactly to the position where the driver intends to confirm, and that, as the Auto state is recovered after his or her confirmation, the optimum beam direction and range can be obtained again. In addition, though there is no description in FIG. 9 about the case that the driver intends to hold the Manual state, it will be appreciated that this case can be supported by switching the Auto/Manual selector switch 82 of the lighting switch 8 from the Auto state to the Manual state.

Figure 10:
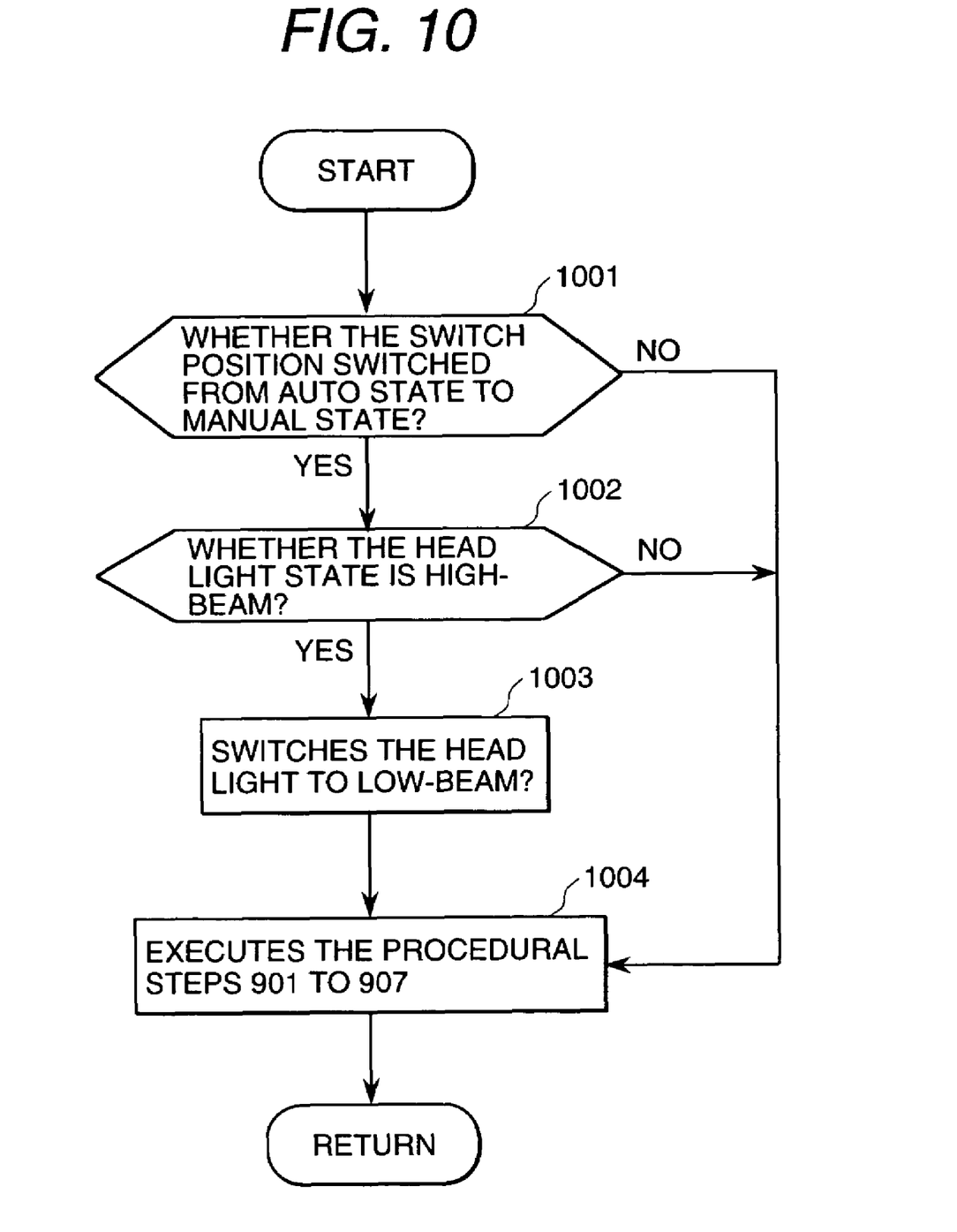
FIG. 10 is a control flow diagram in switching the Auto/Manual selector switch at the auto light system shown in FIG. 1.

FIG. 10 shows the control flow diagram in case that the Auto/Manual selector switch 82 is switched in the auto light system of this embodiment. At first, Step 1001 judges whether the Auto/Manual selector switch 82 is switched from the Auto state to the Manual state. This judgment covers the case that the Auto/Manual selector switch 82 is switched according to Step 802 shown in FIG. 8 and the control flow of Step 907 shown in FIG. 9 even though the driver operates manually the Auto/Manual selector switch 82. Next, if Step 1001 judges that the Auto/Manual selector switch 82 is switched, the procedure proceeds to Step 1002, which judges whether the head light 61 is high beam or not, and in case of high beam, the procedure proceeds to Step 1003. In Step 1003, in order to prevent the driver of the vehicle running ahead from being dazzled by the head light, the head light 61 is switch to low beam, and then the procedure proceeds to Step 1004, in which Steps 901 to 907 shown in FIG. 9 are executed. On the other hand, in case that the judgment conditions for Step 1001 and Step 1002 are not satisfied, the procedure proceeds to Step 1004, in which the procedural steps shown in FIG. 9 are executed. According to this way of control, it will be appreciated that the driver in the preceding vehicle or the vehicle coming from the opposite direction may not be dazzled by the head light by means that the head light is positioned to low beam when switching from the Auto state to the Manual state.

Figure 11:
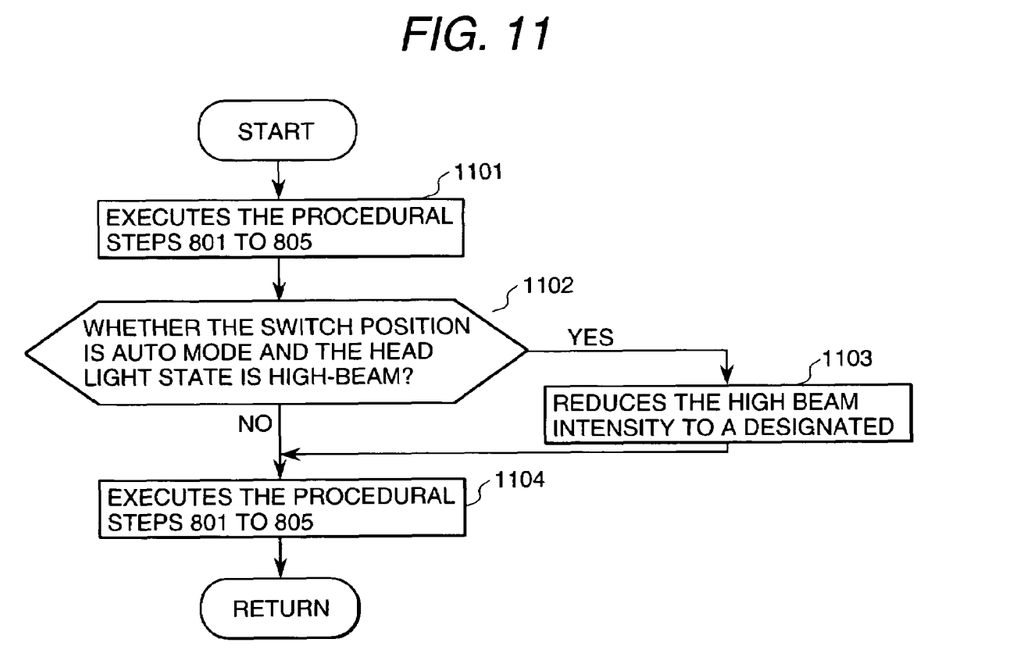
FIG. 11 is a control flow diagram for regulating the light intensity when the head light is of the auto light system shown in FIG. 1 is operated at High Beam

FIG. 11 shows the control flow diagram in case that the light beam intensity is limited when the head light 61 is high beam in the auto light system of this embodiment. At first, in Step 1101, Steps 801 to 805 shown in FIG. 8 are executed. Next, Step 1102 judges whether the Auto/Manual selector switch 82 is at the Auto state and the head light 61 is high beam. If this condition is satisfied, the procedure proceeds to Step 1103, in which the light beam intensity for high beam is changed so as to be lower than a designated value in order to prevent the driver of the vehicle ahead from being dazzled by the head light. After this intensity change, the procedure proceeds to Step 1104, in which Steps 806 to 808 are executed. On the other hand, the condition judged in Step 1102 is not satisfied, the procedure proceeds directly to Step 1104, in which Steps 806 to 808 are executed. In this way of control, it will be appreciated that the glare for dazzling the driver of the vehicle ahead of the driving vehicle can be prevented in case that the head light is switched suddenly to high beam in the existence of the preceding vehicle or the vehicle coming from the opposite direction.

Figure 12:
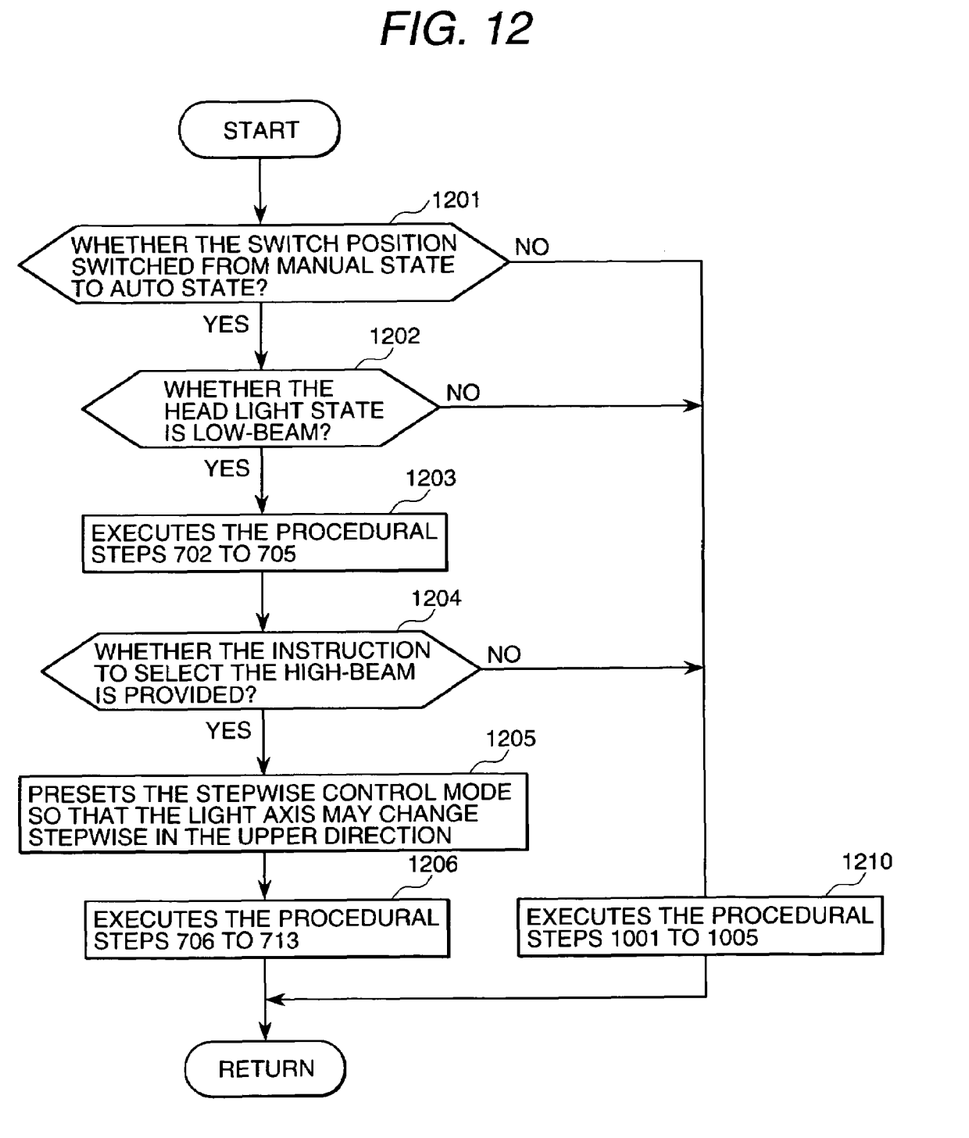
FIG. 12 is a control flow diagram in turning the Auto/Manual selector switch of the head light of the auto light system shown in FIG. 1 to Auto position.

FIG. 12 is the control flow diagram for the head light 61 in case that the Auto/Manual selector switch 82 in the auto light system of this embodiment is switched to the Auto state. Step 1201 judges whether the Auto/Manual selector switch 82 is switched from the Auto state to the Manual state. If the selector switch is switched, the procedure proceeds to Step 1202, which judges whether the head light 61 is low beam or not, and then, if it is low beam, the procedure proceeds to Step 1203. Step 1203 executes Steps 702 to 705 shown in FIG. 7, which sets the direction of the head light 61 in the Auto state according to the vehicle-related data detected by the outside environment detecting apparatus 2. Next, Step 1204 judges whether Step 1203 provides the instruction for setting the head light 61 to be high beam, and if so, the control for shifting up the light axis in the vertical direction stepwise is performed in Step 1205, and the procedure proceeds to Step 1206. In Step 1206, Steps 706 to 713 shown in FIG. 7 are executed, in which the vertical direction light axis displacement is calculated, the head light 61 is controlled in the vertical and horizontal directions, the light state is displayed and the adjusting switch 81 is controlled. On the other hand, in case that the condition judged in Step 1201, Step 1202 or Step 1204 is not satisfied, Steps 1001 to 1005 shown in FIG. 10 are executed. Thus, it will be appreciated that the outside conditions can be notified naturally to the driver by switching stepwise the head light to high beam.

Although one embodiment of the present invention is described above, various modifications of the foregoing design in the specific disclosure can be made without departing from the teachings of the present invention disclosed in the claims.

For example, although the outside environment detecting means uses the data obtained by the detecting apparatus installed in the vehicle, it is allowed to provide the functionality of the outside environment detecting means as the communication with the external system about the information (the whether conditions and the road curvature and so on) as the position information of the vehicle confirmed by GPS installed in the vehicle.

In addition, although the light control means controls the beam direction and range pattern (light beam distance) ahead of the driving vehicle by adjusting the light axis of the head light in the vertical direction, it is allowed to control the beam direction and range pattern by adjusting the light intensity of the head light. It is also allowed to provide the indicator and the manual light operating means with the switches for displaying and operating the light intensity, and to control those switches in the same method as the light axis adjusting switch.

In addition, it is allowed to control the head light based on the control flow obtained by combining the control flows described in FIGS. 7 to 12, and the light control could be organized successfully even if procedural steps are rearranged, which will be well understood by those skilled in the art.

As well understood through the foregoing specific disclosure, according to the auto light system of the present invention, it will be appreciated that, owing to providing the display means for displaying the light control state, the light beam direction and range can be easily recognized in such a condition that the driver finds it difficult to recognize the head light status when he or she drive the vehicle at nightfall, in the rain or on the bright street in down town.

In addition, it will be appreciated that the light beam direction and range can be easily recognized in case of controlling stepwise the head light direction and range in the vertical and horizontal directions.

In addition, as the light control status is fed back to the switch of the manual light operating means, it will be appreciated that the driver can confirm the light status by observing those switches, and as the switch itself indicates the light control status, he or she can judge promptly how to operate the switch and can operate the switch easily.

What is claimed is:

1. An auto light system comprising:
    a light control means, for controlling lights of a vehicle; and
    a display means for displaying a vertical beam range distance and a horizontal beam direction of a headlight controlled by said light control means.

2. The auto light system of claim 1, wherein:
    said light control means comprises an adjusting element for adjusting an operating state of said lights, and a selector switch for selecting between automatic control of said adjusting element by a vehicle controller and manual control of said adjusting element by a vehicle operator; and
    both of said adjusting element and said selector switch are operable both manually by the driver and automatically by the controller.

3. The auto light system according to claim 1, wherein said display means indicates one of at least three beam range distances in a traveling direction of the vehicle.

4. An auto light system comprising:
    light control means which generates an output signal for controlling a light of a vehicle;
    a manual light operating means for operating manually said light: wherein
    said manual light operating means is operated based on an output signal from said light control means; and
    said system further comprises a driving means that drives a position of said manual light operating means for manual operation of said light based on the output signal from said light control means.

5. A system for controlling an automotive light, said system comprising:
    an adjusting element for adjusting an operating state of said automotive light;
    an auto/manual selector switch for selecting either automatic control of said adjusting element or manual control by a vehicle driver;
    sensors for determining operating conditions of said vehicle; and
    a controller coupled to receive signals from said sensors and to generate control signals based on said signals; wherein
    both of said adjusting element and said selector switch are operable both manually by said driver, and automatically in response to signals from said controller;
    when said selector switch is set for manual control, the driver controls a position of the adjusting element manually; and when said selector switch is set for automatic control, said controller controls the position of the adjusting element.

6. An auto light system of claim 5, wherein:
if the driver operates the adjusting element when said selector switch is set for automatic control, the controller sets the selector switch to manual control for a preset duration, after which it returns to automatic control.

* * * * *